United States Patent
Ayash

[19]

[11] Patent Number: 5,840,345
[45] Date of Patent: Nov. 24, 1998

[54] DOUGH TRANSPORT DEVICE

[76] Inventor: Ajwad Ayash, 4504 John Tyler Ct., Annandale, Va. 22003

[21] Appl. No.: 422,952

[22] Filed: Apr. 17, 1995

[51] Int. Cl.[6] ................................................ A23P 1/12
[52] U.S. Cl. .......................... 425/311; 425/208; 425/209; 425/313; 426/503; 426/504; 83/331; 83/307.1; 83/307.3; 83/932; 366/88; 366/286; 366/323
[58] Field of Search ................................. 425/205, 208, 425/209, 296, 311, 313, 312; 426/503, 504, 518; 366/88, 286, 323; 83/307.1, 307.3, 331, 651.1, 663, 932

[56] References Cited

U.S. PATENT DOCUMENTS

| | | | |
|---|---|---|---|
| 2,481,275 | 9/1949 | Ambrette | 107/7 |
| 2,858,775 | 11/1958 | Marasso | 107/15 |
| 2,931,387 | 4/1960 | Fleming | 137/608 |
| 3,776,671 | 12/1973 | Bruschke et al. | 425/164 |
| 3,941,538 | 3/1976 | Orlowski | 425/241 |
| 4,015,926 | 4/1977 | Nehmey | 425/464 |
| 4,076,477 | 2/1978 | Hacke | 425/382 |
| 4,118,164 | 10/1978 | Wenger et al. | 425/205 |
| 4,233,018 | 11/1980 | Chinfen | 425/297 |
| 4,332,538 | 6/1982 | Campbell | 425/140 |
| 4,337,791 | 7/1982 | Tech et al. | 137/556 |
| 4,424,236 | 1/1984 | Campbell | 426/231 |
| 4,449,908 | 5/1984 | Campbell | 425/204 |
| 4,517,212 | 5/1985 | Campbell | 426/496 |
| 4,688,753 | 8/1987 | Tseng et al. | 251/7 |
| 4,747,767 | 5/1988 | Schnell | 425/311 |
| 4,786,517 | 11/1988 | Pinto | 426/503 |
| 4,895,341 | 1/1990 | Brown et al. | 251/8 |
| 4,948,611 | 8/1990 | Cummins | 426/503 |
| 5,046,940 | 9/1991 | Cummings | 425/239 |
| 5,096,406 | 3/1992 | Brooks et al. | 425/205 |
| 5,114,331 | 5/1992 | Umehara et al. | 425/205 |

*Primary Examiner*—David W. Wu
*Attorney, Agent, or Firm*—Cushman Darby & Cushman IP Group of Pillsbury, Madison & Sutro, LLP

[57] ABSTRACT

The present invention provides a dough transport device having an improved dough pump, an improved manifold for dividing dough, and a rotational cutter for cutting dough into pieces of uniform shape and size. The auger dough pump operates using a auger which is tapered to provide for more efficient control over the transport of the dough. Further, the rotational cutter cooperates with a curved face of each outlet nozzle in the manifold to provide for a curved dough shape upon initial cutting of the extruded dough.

42 Claims, 14 Drawing Sheets

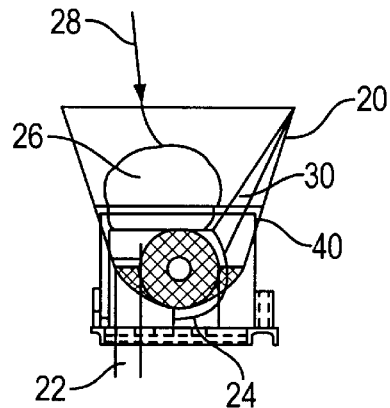
FIG. 2B
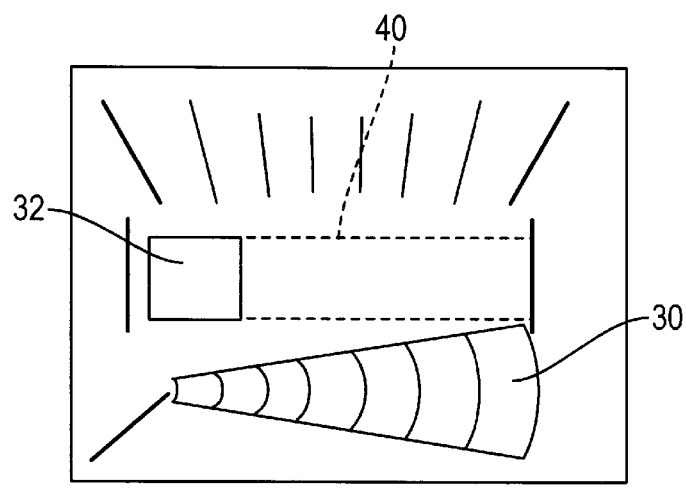
FIG. 2C1
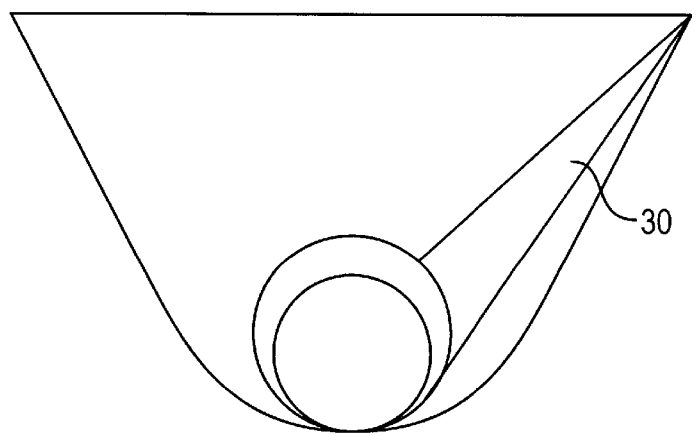
FIG. 2C2

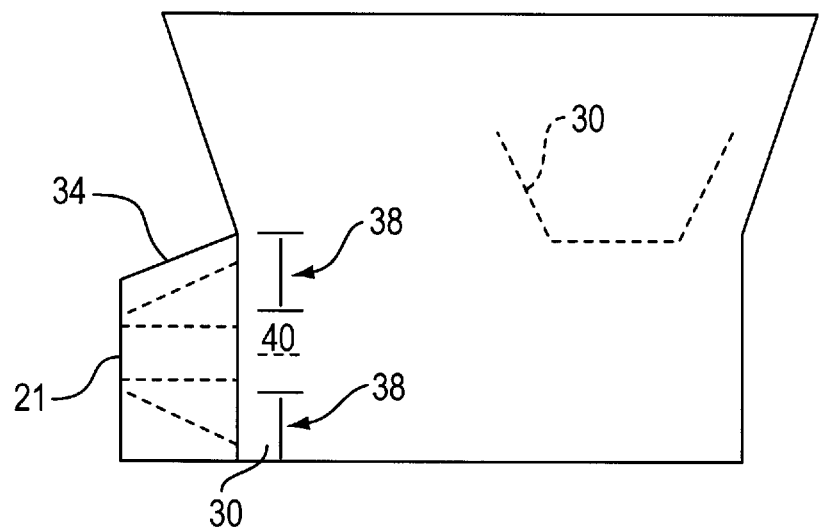
FIG. 2C3
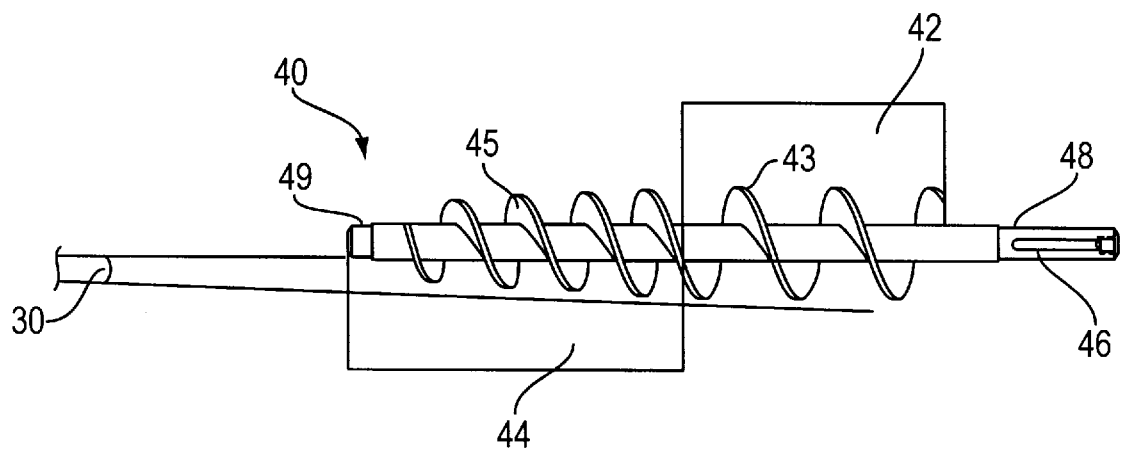
FIG. 3A

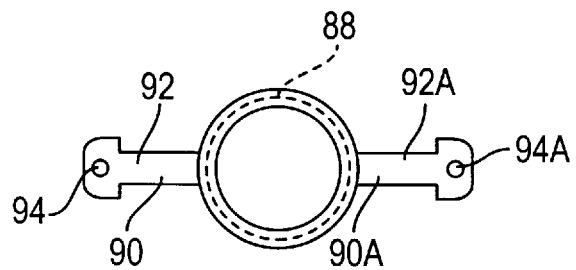
FIG. 3D1
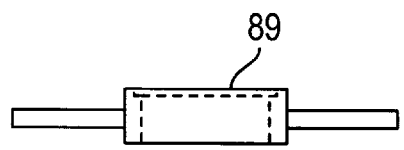
FIG. 3D2
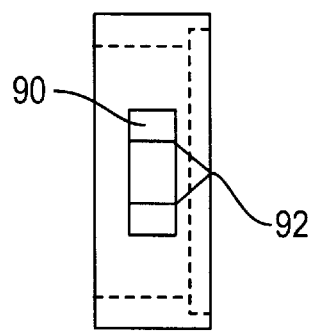
FIG. 3D3

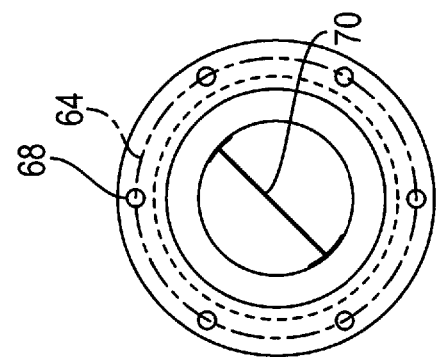
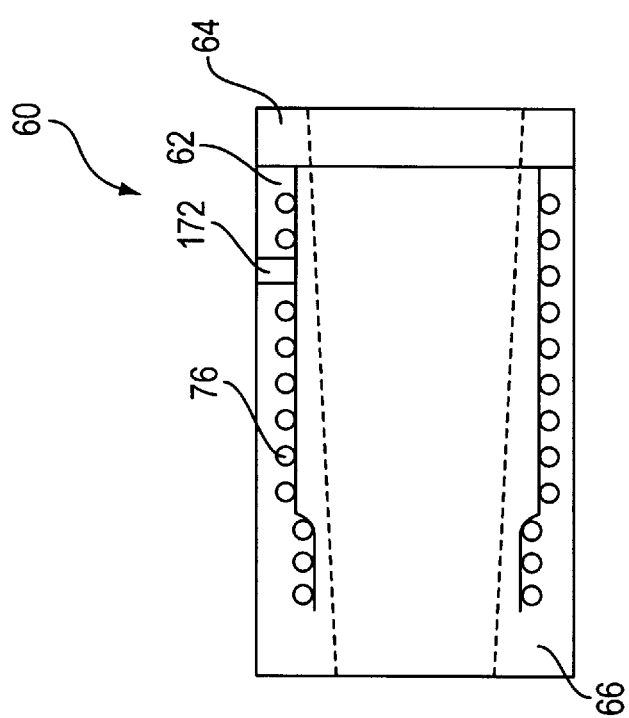
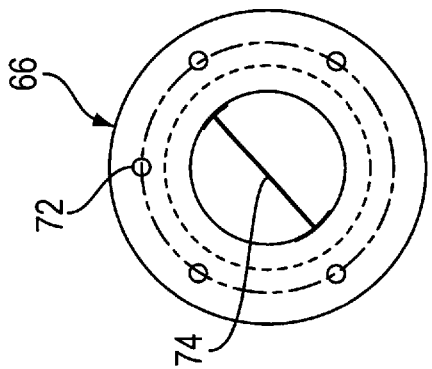

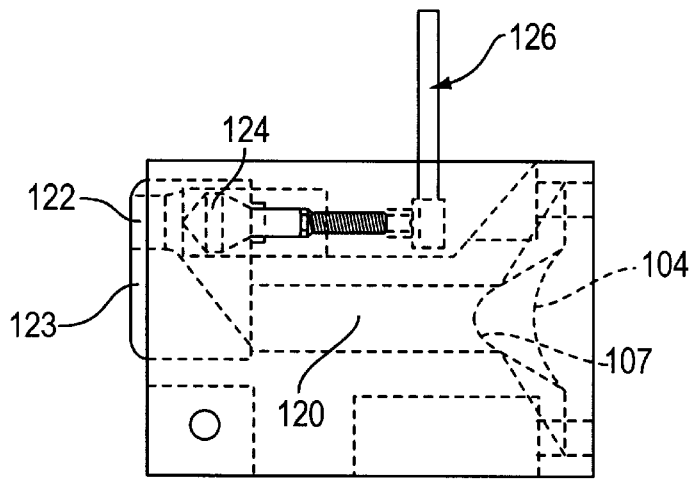
FIG. 5C1
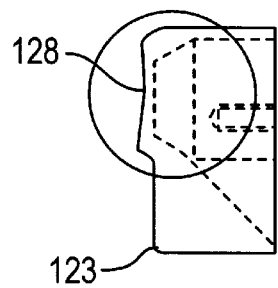
FIG. 5C2
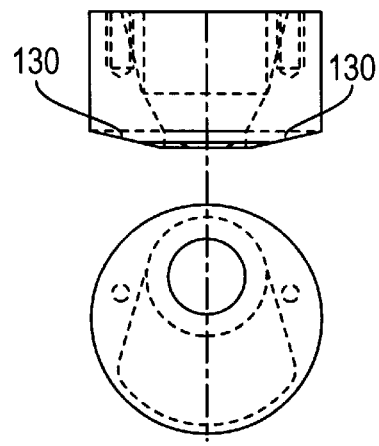
FIG. 5C3

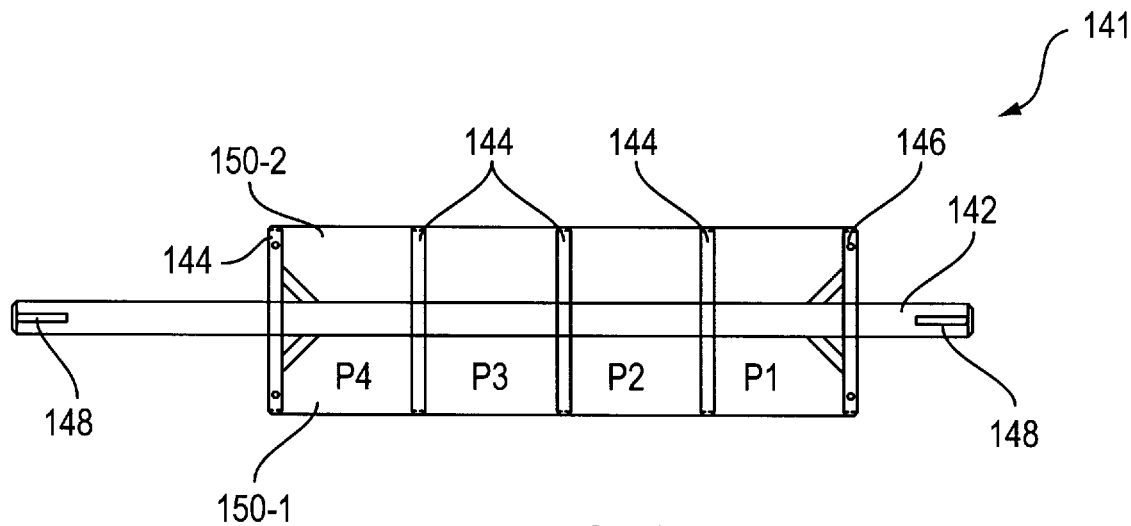
FIG. 6A
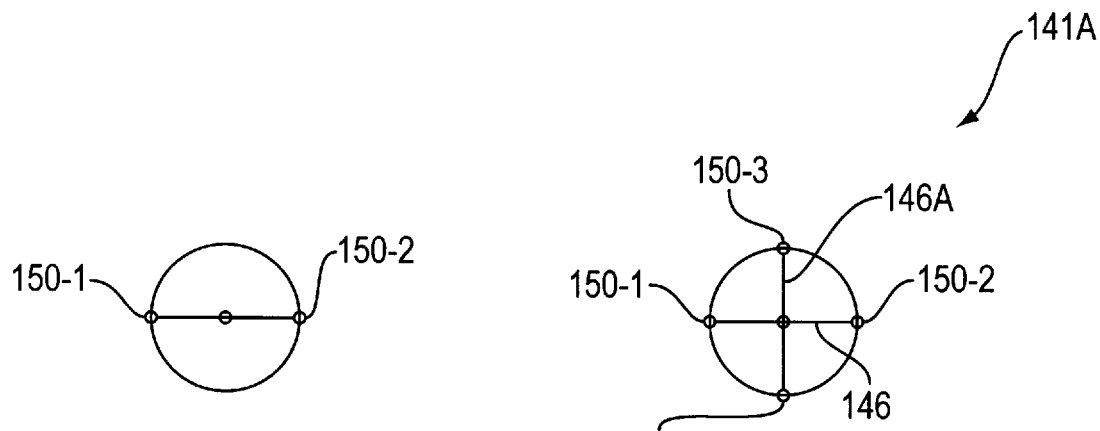
FIG. 6B
FIG. 6C
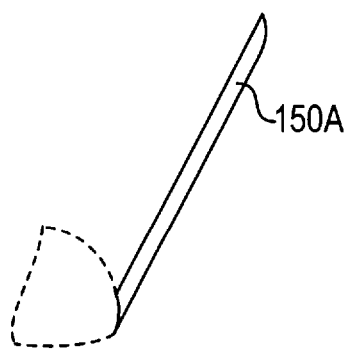
FIG. 6D

DOUGH TRANSPORT DEVICE

BACKGROUND OF THE INVENTION

1. The Field of the Art

The present invention relates to a dough transport device and, more particularly, to an apparatus for moving and dividing dough.

2. Description of the Related Art

Devices for transporting and dividing dough are well known. In general, such devices take pre-mixed dough and transport the dough using an auger type dough pump to a manifold. At the manifold, dough is extruded or dispensed at a nozzle and then cut into uniform pieces by a cutter.

Although such a dough transport devices as described above are well known, problems still exist in such devices, especially when the extended use of the devices in a commercial setting is considered. Over time, known dough transport devices tend to require large amounts of maintenance as well as having a decreased life-span due to their inherent construction.

An example of this is the use of metering pumps, which commercial bakeries rely on to ensure that a consistent amount of dough is delivered from the auger pump to the manifold. Such metering pumps are an extra component located between the end of the auger and the manifold and rely on positive displacement to operate. However, such metering pumps are very expensive in the first instance and also require much maintenance to clean and the like. One example of required extra maintenance and thus extra undesired cost is that such metering pumps cause undesired pressures which tend to wear out auger pump bearing surfaces. Such bearing surfaces thus wear out more quickly and need to be replaced on a much more frequent basis.

In order to reduce the type of problems described above, the present inventions improve the performance of dough transport devices by providing mechanisms which are not subject to wear and deterioration to the degree of known dough transport devices.

SUMMARY OF THE INVENTION

It is therefore an object of the present invention to provide a dough transport device having a structure which causes an extended usable life of the device.

It is another object of the present invention to provide structures which allow for the wear on the device to be compensated for during the usable life of the device.

It is a further object of the present invention to provide a device that allows for dividing dough into a more uniform shape then previously possible. It is still a further object of the present invention to provide a single auger effect that keeps the dough moving while it is in the hopper of the device and, therefore, provide additional stability, degassing and development to the dough.

In order to attain the above recited objects of the invention, among others, the present invention provides a dough transport device having an improved dough pump, an improved manifold for dividing dough, and a unique rotational cutter for cutting dough into pieces of uniform shape and size.

The improved auger dough pump provides performance which equals that obtained when using a metering pump which operates using a positive displacement effect, without the use of such a metering pump. The auger dough pump operates using a tapered auger which provides a more efficient way of transporting a uniform amount of dough to the manifold section of the transport device. It also provides for less shear action and the less interference with the gluten structures of the dough on which the quality of the final dough product depends.

Furthermore, the gap between the outer diameter of the tapered auger can be adjusted relative to the inner diameter of the tunnel through which the dough is directed. As a result of this gap adjustment feature, the dough transport device of the present invention can be adjusted for both dough development and to compensate for wear that takes place between the auger and the tunnel. As a result, this extends the usable life of the device.

An extended usable life is also obtained because no moving parts are used when dividing the dough. A bearing which supports one end of the tapered auger also acts as a knife to divide the moving dough in two streams as it enters the manifold. Within the manifold, which divides the dough and directs it to a plurality of ports, the present invention uses a simple structure of machined or molded holes which present a sharp edge to the dough being directed through the manifold. As a result of this structure, there are no moving parts that can break, while the dough can be divided in a simple and efficient manner. The relative length and diameter of the different holes compensate to ensure that equal amounts of dough are extruded from each port.

A further advantage of the present invention, as noted above, is a rotational cutter which provides a more efficient way of cutting a dough ball having a desired round shape. This rotational cutter cuts the dough that is extruded from the nozzle in each of the ports of the manifold. Furthermore, each outlet nozzle in the manifold section has a curved shape, which shape substantially corresponds to the arc of the cutting blade of the rotational cutter. As a result, the dough ball emitted from each of the nozzles is cut along a curved path. With this structure, the dough can be cut to have a more uniform shape and size.

BRIEF DESCRIPTION OF THE DRAWINGS

These and other advantages of the present invention may be appreciated from studying the following detailed description of the preferred embodiment together with the drawings in which:

FIG. 2B illustrates a cut away view along line 2—2 of FIG. 2A;

FIGS. 2C1–2C3 illustrate top, back and side views of the hopper according to the present invention;

FIG. 3A illustrate the auger according to the present invention;

FIGS. 3C–3D3 illustrate the auger support/knife according to the present invention;

FIGS. 4A–4C illustrate the tunnel through which the dough is transported according to the present invention;

FIGS. 5A–5C3 illustrate the manifold structure of the present invention;

FIGS. 6A–6E illustrate the rotational cutter according to the present invention;

DETAILED DESCRIPTION OF THE PREFERRED EMBODIMENT

Figure 1:
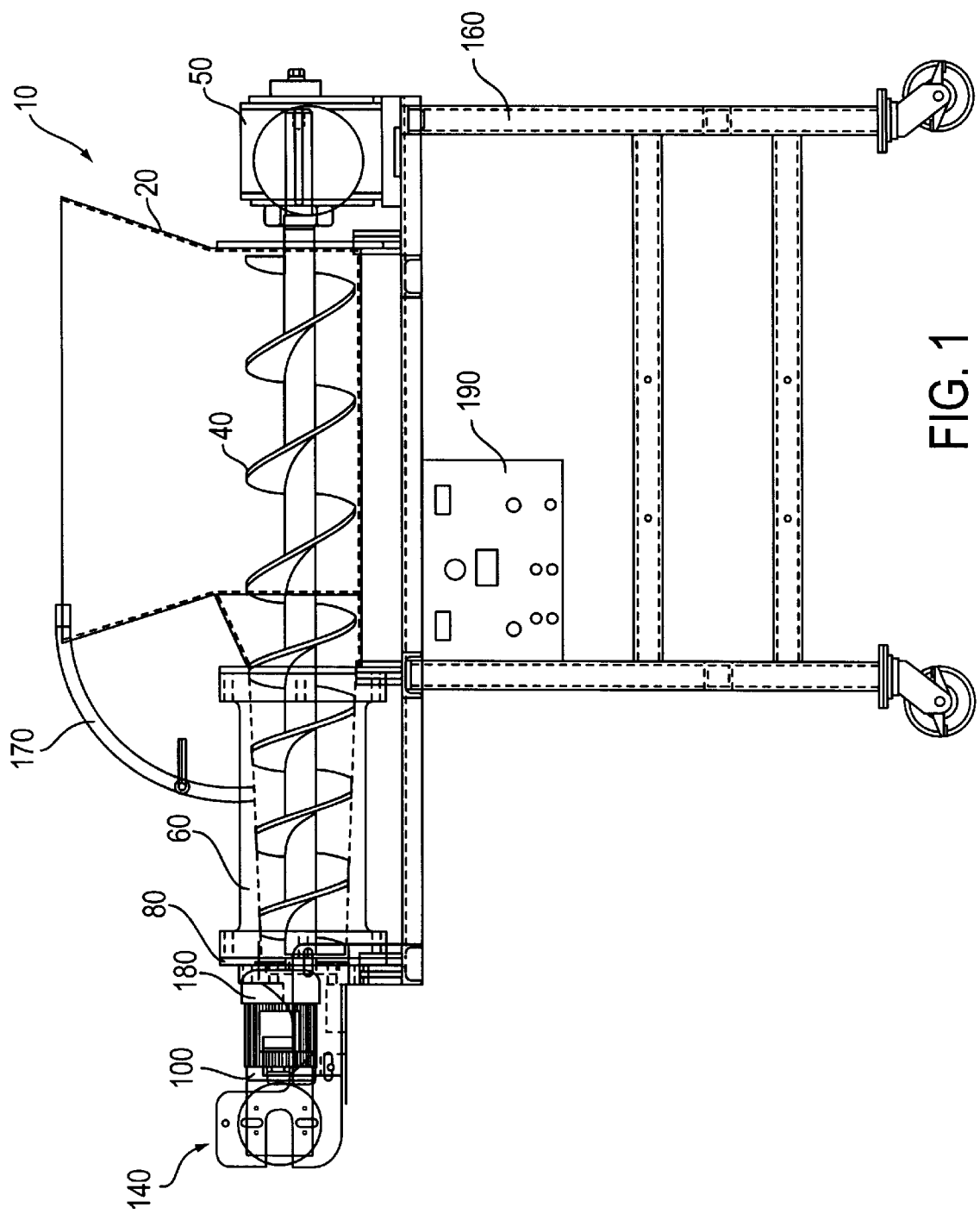
FIG. 1 illustrates a side view of the entire dough transport device.

FIG. 1 illustrates, in side view, the dough transport system 10, according to the present invention. Components include a hopper 20, an auger 40, an auger motor 50, a tunnel 60, an auger support/knife 80, a manifold 100 for dividing dough, and a rotational cutter 140.

The system 10 is mounted on a moveable housing 160. Also included are a degassing/cleaning mechanism 170, a pressure transducer 180 and a control panel 190, each of which will be described in further detail hereinafter.

Figure 2A:
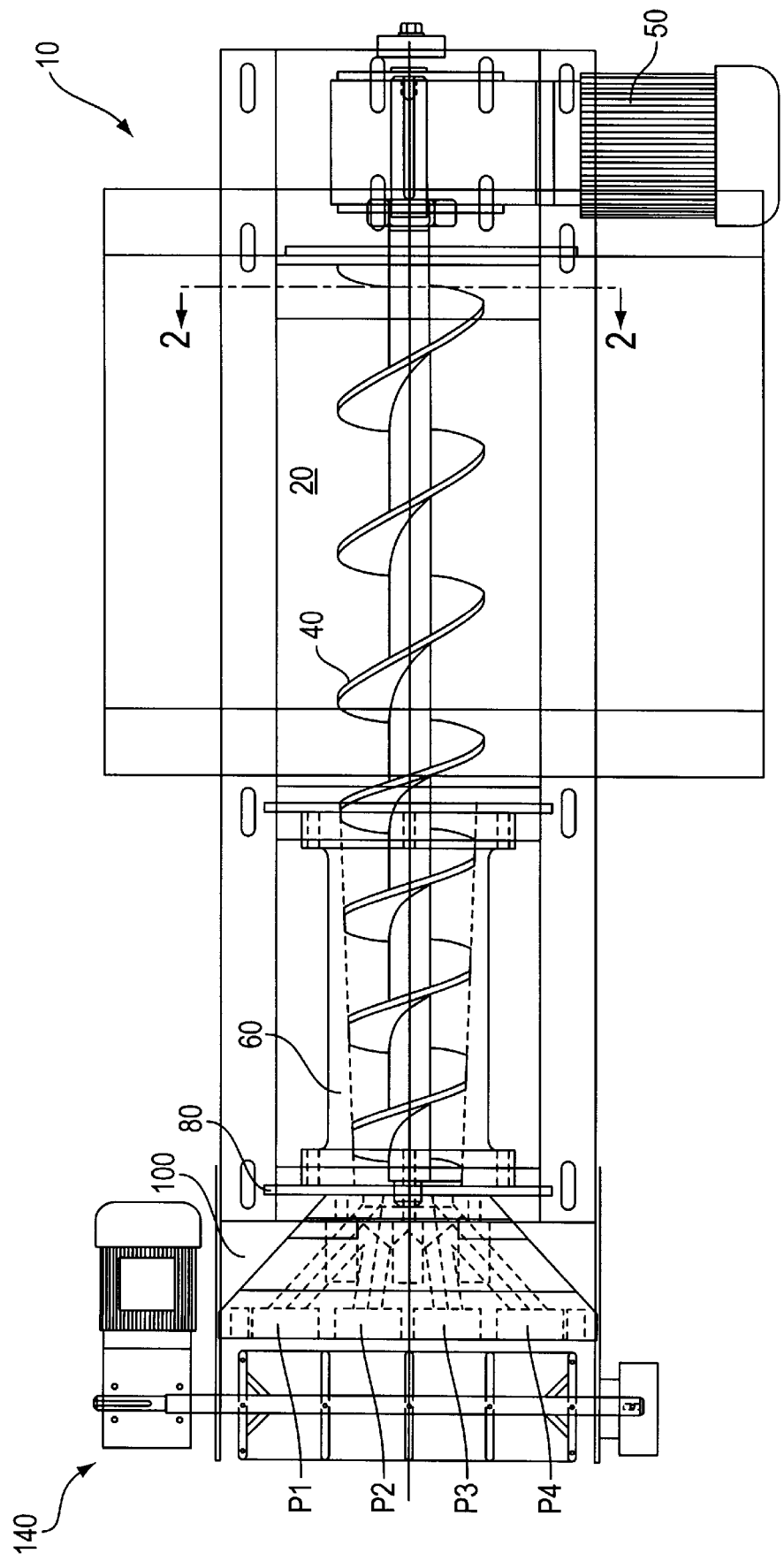
FIG. 2A illustrates a top view of the dough transport device.

The FIG. 2A illustrates a top view of the dough transport device 10. It should be noted that with respect to FIG. 2A as well as other drawing figures hereinafter, the same reference numeral will be used to describe similar structure.

Dough enters the hopper 20, is directed by the auger 40 out of the hopper though a dough transport opening 21 illustrated in FIG. 2C3 to the tunnel 60 and thereafter through to the manifold 100. Dough is extruded from the manifold 100 at each of four separate ports P1, P2, P3 and P4. As a result, in the preferred embodiment, four separate masses of dough are extruded from the manifold 100 and then cut by the rotational cutter 140. It should be noted however, that although four ports P1, P2, P3 and P4 are illustrated as the preferred embodiment, that different numbers of ports are possible. For instance, two or four ports per auger are typical for making buns, but for making bread one or two ports per auger are typical.

FIG. 2B illustrates the positioning of the auger 40 within the hopper 20. Important positioning characteristics of the auger 40 with respect to the hopper 20 are the distances 22 and 24 represented in FIG. 2B. The distance 22 is the spacing between the outer diameter of the auger 40 at the feed position 32 illustrated in FIG. 2C1 of the hopper 20 and the parallel inner hopper surface, which is preferably 6–8 inches. The distance 24 determines the amount of dough the auger 40 picks up, and this distance is preferably 6–8 inches. Both distances 22 and 24 are important to ensure that the proper amount of dough is fed into the auger 40 from the hopper 20 during use. The larger the distance 24, the greater the resistance that will exist between the auger 40 and the inner edge of the hopper 20. The distance 24 can be increased to cause increased feed to the auger 40. It should also be noted that the portion of the hopper 20, above the auger 40, but not the lower portion of the hopper 20 where the pumping action is taking place, is preferably coated with teflon.

Also illustrated in FIG. 2B is a dough ball 26. This dough ball is preferably created when the dough is fed into a dough entry area of the hopper in the direction of arrow 28 into the hopper 20. This dough ball rotates in a direction opposite to that of auger 40, which provides additional stability, degassing and development to the dough.

FIGS. 2B–2C3 illustrate different views of the stainless steel hopper 20 to illustrate stainless steel plate 30 welded to the hopper 20. FIG. 2C3 illustrates that the plate 30 is basically a triangular shape that is curved to fit into the hopper and have a smaller amount of dead space at the preferred in-feed portion 32 than at the opposite end of the hopper 20. Plate 30, in effect, takes up dead space that exists on the low pressure side (since the auger rotates counterclockwise when looking from the rear of the device 10 as in FIG. 2B) of the hopper 20 that exists. This dead space, if not taken up by plate 30, tends to cause an undesired build-up of dough that does not move in that area. Such build-up is undesirable since it interferes with the continuous development of dough.

Also illustrated in FIG. 2C3 is the shroud portion 34 of the hopper 20 made of stainless steel sheet metal which provides a funnel shaped opening to the tunnel 60 from the hopper 20. This funnel shaped opening is about 6" long and provides a lip 38 that is about 3" larger than the outer flights of the auger 40, also shown in dotted line in FIG. 2C3. Such a funnel shaped opening 36 has been found advantageous in assisting the degassing process of the dough.

FIG. 3A illustrates the auger 40 according to the preferred embodiment, which is made of stainless steel or a plastic material such as UHMW and is preferably between four and five feet in length. This length of the auger 40 contains the hopper section 42 as well as the tunnel section 44. The hopper section 42 and tunnel section 44 of the auger 40, when in use, correspond to the portions of the auger 40 within the hopper 20 and the tunnel 60, respectively. Both the hopper section 42 of the auger 40 and the abutting surfaces of hopper 20 as well as the tunnel section 44 of the auger 40 and its corresponding abutting surfaces of the tunnel 60 are tapered between about 2° and 10°, with a 3° taper being preferable with respect to the center line of the auger 40 as illustrated in FIG. 3A. Although the preferred embodiment illustrates both the hopper section 42 and the tunnel section 44 of the auger 40 with a single uniform taper, it is entirely consistent with and within the scope of the present invention to taper only one of these portions, such as the tunnel section 44 and not the hopper section 42, or to taper these portions differently, particularly tapering the tunnel section 44 more than the hopper section 42.

Furthermore, as illustrated in FIG. 3A, the auger 40 has flights 43 within the hopper section 42 pitched to a greater degree than the flights 45 within the tunnel section 44 (6" compared to 4" in the preferred embodiment). This further ensures that the volume of dough reaching the manifold 100 is consistent.

Auger 40 also contains a chamfered end 49 which is used to support that end of auger 40 as will be described hereinafter.

FIG. 3A also illustrates a portion of the gap adjustment mechanism for the auger according to the present invention, which portion is the threaded auger shaft 46, as well as threads 48 on the outer diameter of the auger shaft end.

Figure 3B:
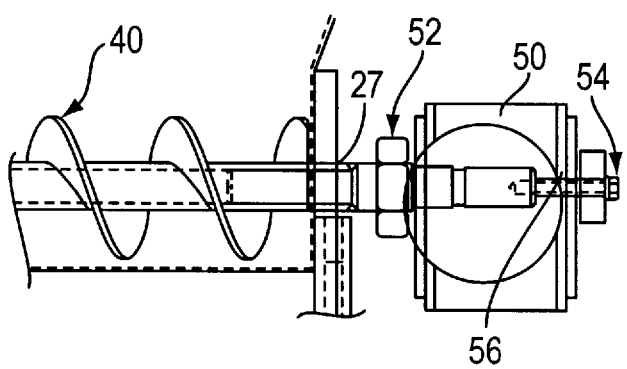
FIG. 3B illustrate the auger gap adjustment mechanism according to the present invention.

FIG. 3B shows further details of the gap adjustment mechanisms for the auger 40 according to the present invention. The end of the auger 40 passes through a sealed auger shaft opening 27 in the hopper 20 and is attached to the auger drive motor 50, which has 5 h.p., using auger nut 52 that is variable in position using the threads 48 shown in FIG. 3A and the locking mechanism 54. Referring again to FIG. 3B, the locking mechanism 54 contains a threaded projection 56 which inserts into the threaded shaft 46 illustrated in FIG. 3A. Through appropriate adjustment of the auger nut 52 and the locking mechanism 54, the chamfered end 49 of the auger 40 can be adjusted with precision so that the desired gap between the outer diameter of the flights on the auger 40 and the inner diameter of the tunnel 60 can be maintained precise to within 0.001 of an inch. As noted previously, if wear through normal use takes place on the outer diameter of the flights of the auger 40 or the inner diameter of the tunnel 60, this gap adjustment mechanism can be adjusted for this wear so that the desired gap can be consistently maintained. Also, development of the dough can be adjusted for by controlling the size of the gap. A smaller gap will provide for no back slippage and thus no further development of the dough. A large gap will allow back slippage of the dough and thus extra development of the dough will take place. This horizontal movement of the auger 40 preferably has a range of 0.25–0.5 inches. It should also be noted that the auger nut 52 also acts as a thrust spacer and transfers the thrust load to the motor bearing that exists within auger motor 50.

FIGS. 4A–C illustrate the tunnel 60 preferably made of stainless steel, but which can also be made of plastic such as UHMW. The funnel shaped tunnel opening 62 is best shown in dotted line in FIG. 4B and the mounting ends 64 and 66 are best shown in FIGS. 4A and 4C, respectively. The mounting end 64 is bolted to the hopper 20 whereas the end 66 is mounted through the auger support/knife assembly 80 illustrated in FIG. 3C to the manifold 100 illustrated in FIG. 5B, which connection is described further hereinafter.

The largest diameter taken in cross section of the funnel shaped tunnel opening 62 exists at the end of mounting end 64 and is illustrated in FIG. 4C as diameter 70 which corresponds to a diameter of 7.75". The smallest diameter taken in cross section of the funnel shaped tunnel opening 62 exists at the end of mounting end 66 and is illustrated in FIG. 4A as diameter 74 which corresponds to a diameter of 5.0".

Also illustrated in FIG. 4B is a water cooling jacket 76 that is wrapped around the funnel shaped tunnel opening 62 of the tunnel 60. This water cooling hose 76 is adapted to have cold water (around 60°–70° F.) circulate therethrough so that the dough within the tunnel 60 is maintained at a consistent temperature.

Figure 3C:
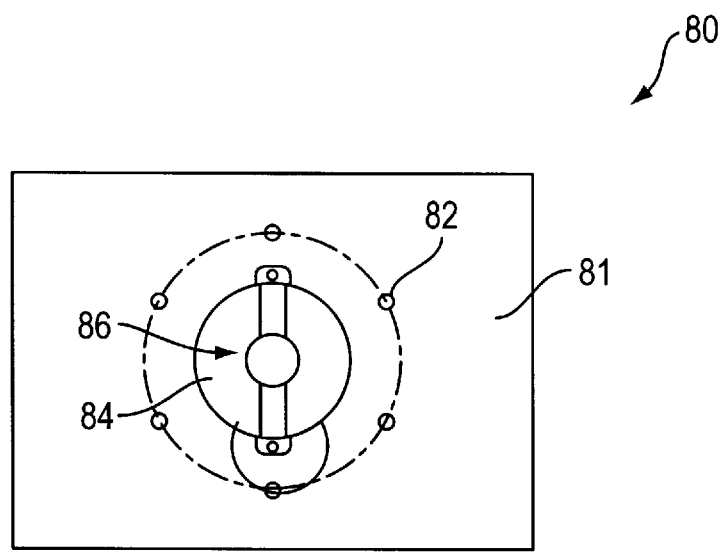

FIG. 3C illustrates the auger support/knife assembly 80, into which the chamfered end of the auger 40 is supported at the end of the tunnel 60 when in use. The auger support/knife assembly 80 is preferably a 0.25" stainless steel plate 81 having a hole 84 which corresponds in diameter to that of the diameter 74 illustrated in FIG. 4A and described previously. Also contained therein are bolt holes 72 thorough which bolts pass that sandwich the auger support/knife assembly 80 between the mounting end 66 of tunnel 60 illustrated in FIG. 4A and the manifold 100 illustrated in FIG. 5B.

As FIG. 3C illustrates, the auger support/knife assembly 80 has an elongated support bracket 86 which is mounted vertically when in use so that dough divides into left and right halves after passing this point, as will be described hereinafter. FIGS. 3D1–3D3 illustrate more clearly that the elongated support bracket 86 contains a stainless steel bearing housing 88 having a UHMW bearing 89 disposed therein and into which the chamfered end 49 of auger 40 rests. Welded to the stainless steel housing 88 are stainless steel bearing support arms 90 and 90A, each of which have pin holes 94 for secure connection to the plate 81 as illustrated in FIG. 3C. Further, each support arms 90 and 90A are constructed so as to present a knife edge 92 and 92A, best illustrated in FIG. 3D3, to the dough being directed at it by the auger 40 when in use.

Figure 5A:
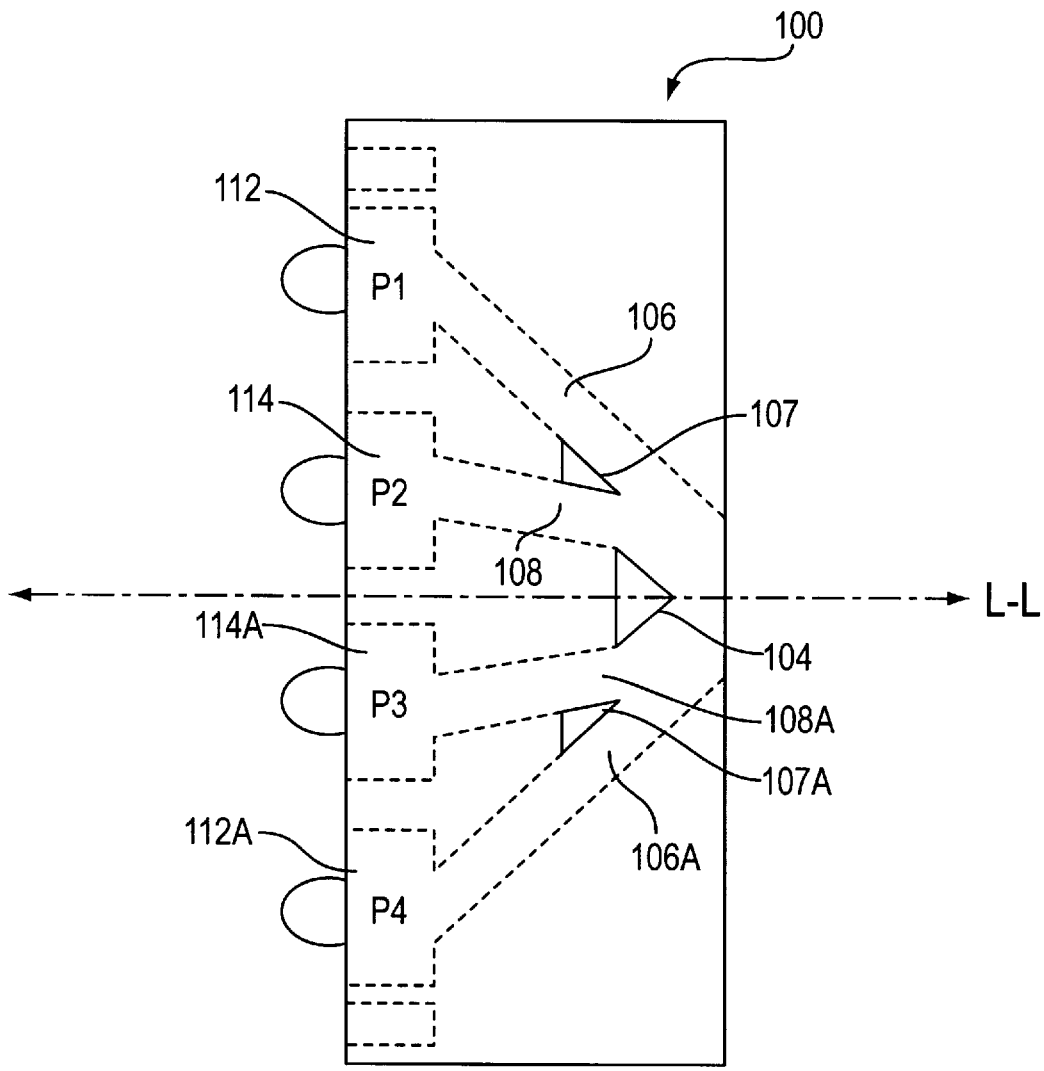
Figure 5B:
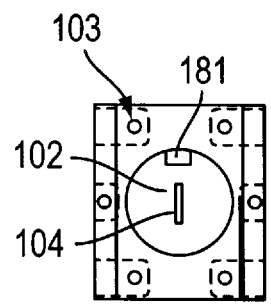

FIG. 5A illustrates a top view of the manifold 100. Ports P1, P2, P3 and P4 for extrusion of dough are illustrated as ports 112, 114, 114A, and 112A. The manifold 100, preferably constructed of food grade plastic, contains a single dough input hole 102, illustrated in FIG. 5B, which receives the dough streams that have already been once cut by the knife edges 92 and 92A of auger support/knife assembly 80. The holes 103 illustrated in FIG. 5B are used to connect together the manifold 100, the auger support/knife assembly 80 and the tunnel 60.

Within the manifold 100, holes 106 and 108 and respectively identical 106A and 108A, are molded or drilled so as to present only smooth surfaces within the manifold 100 except at the knife edges described hereinafter. These holes 106, 108, 106A and 108A are used to direct the dough to each of the ports 112, 114, 112A and 114A, respectively. These holes are made so that a knife edge 104 is presented at the junction between holes 108 and 108A. This knife edge 104 is represented by the point of the dark colored triangle in FIG. 5A and is also seen in FIG. 5B. Knife edges 107 and 107A are similarly represented in FIG. 5A and cut the dough that is being directed to that portion of the manifold so that portions of the dough are directed to holes 106 and 108 and portions 106A and 108A, respectively. These knife edges 107, 107A and 104, having no moving parts and no square corners, simply and efficiently divide the dough that is being directed through manifold 100 to the respective ports P1, P2, P3 and P4. Prior to the dough being divided by the knife edge 104, the dough is also divided by the knife edges 92 and 92A of auger support/knife assembly 80, as described previously. As a result, these knife edges all cooperate to efficiently divide the dough into four different streams which are then directed through each of the holes to the respective extrusion port.

It should be noted that the dimensions of the holes 106 and 108, as well as the identical dimensions of the holes 106A and 108A are predetermined in both length and diameter so that an equal amount of dough will be presented and extruded from each of the ports. It has been determined that the holes 106 should have a length of 9.0" and a diameter of 1.25" and that holes 108 should have a length of 8.5" and a diameter of 1.0" with respect to the preferred embodiment described herein so that a substantially equal amount of dough is presented per unit time to each of the ports P1–P4. Of course, other dimensions for the length and diameter of these holes are possible.

FIG. 5C1 illustrates one of the ports which could be any one of ports 112, 114, 114A, and 112A illustrated in FIG. 5A. Dotted lines 104 and 107 represent the knife edges 104 and 107 where dough is being divided within the manifold 100, as described previously. As illustrated, each port contains a channel 120 through which the dough is directed to the outlet nozzle 122, which has a hole with a diameter of about 1.5". When pushed out of the outlet nozzle 122, a dough ball thus forms exterior to the face 123 of the outlet nozzle 122. Also illustrated in FIG. 5C1 is a plunger 124 which is connected to a rachet 126. The rachet 126 can be used to precisely adjust the amount of dough that is extruded from the nozzle.

FIG. 5C2 illustrated an exploded view of the outlet nozzle 122, and more specifically, the face 123 at the location where the dough is extruded which has a curved portion 128. The curvature of the curved portion 128 substantially corresponds to the arc of a circle having an 8" diameter. The advantageous features of this particular aspect of the outlet nozzle 122 will be explained hereinafter when the rotational cutter 140 is further described.

FIG. 5C3 illustrates a top view and a front view of the outlet nozzle 122 containing the curvature referenced with respect to FIG. 5C2. As is apparent, the sidewalls 130 of the outlet nozzle 122 are beveled, which provides for an advantageous interaction with the rotational cutter 140 as described hereinafter.

Figure 6E:
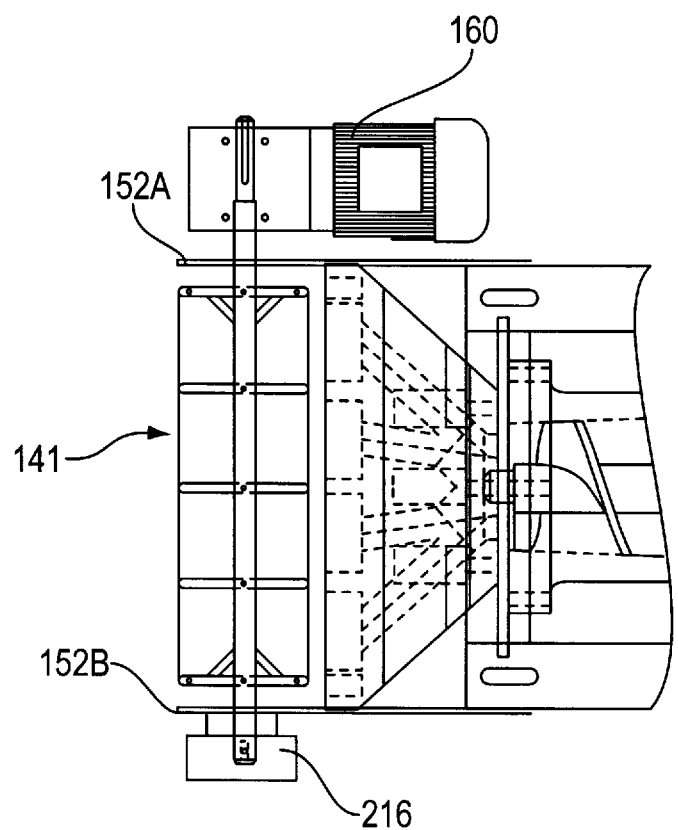

FIG. 6A illustrates the cutting mechanism 141 of the rotational cutter 140. In this cutting mechanism 141, there is a stainless steel shaft 142 on which stainless steel spokes 144 and 146 are mounted so as to extend an equal distance on each side of the shaft 142 and spaced in equi-distant relation perpendicular to the shaft, thus leaving an open gap between spokes and a balanced combination of the shaft with spokes. This provides four spaces between each of these five spokes 144 and 146 for different dough balls that are formed by extrusion from the ports P1, P2, P3 and P4 as described above with respect to FIG. 5A. The cutter portion 141 of the rotational cutter 140 rotates about the center axis of shaft 142. The shaft 142 has, on each end, a machines slot 148 that is used to attach this cutting mechanism 141 to the cutter motor 160. Plates 152A and 152B support the shaft 142 in position, as also illustrated in FIG. 6E. In use, this rotational cutter 140 rotates about the center axis of shaft 142 and is driven by cutter motor 160. With this arrangement, an entirely rotational cutting action is obtained, which reduces wear on the cutter motor 160 as well as the other components.

FIGS. 6A also illustrates that 0.0625" stainless steel wires 150-1 and 150-2 are attached to the outer portion of the spokes 144 and 146 such that an open space exists between the wire 150-1 and the shaft 142, as well as the wire 150-2 and the shaft 142. The wires 150-1 and 150-2 act as a cutting edge to perform the cutting action on the extruded dough. As a result, the surface area in contact with the actual dough being cut is minimized due to the small surface area of wires 150. This allows for a cleaner cut to be obtained then has been previously known. Furthermore, because of the rotary motion, the wire 150 cuts with an arc, which cutting arc corresponds to the arc previously described that is formed at curve 128 of the outlet nozzle 122 illustrated in FIG. 5C2. As a result, the resulting dough ball that is cut has a round shape that is already introduced into the cut dough ball prior to the use of any rounders or the like.

FIG. 6B illustrates in side view the embodiment of FIG. 6A in which there are wires 150-1 and 150-2. FIG. 6C illustrates an alternate cutting mechanism 141A of rotational cutter 140. This alternate cutting mechanism 141A has associated with it spokes 144, 146 146A and 144A which can be used to string four different wires illustrated as wires 150-1, 150-2, 150-3 and 150-4. With this construction, the speed of the cutting mechanism 141A can be reduced, which reduces the speed required from cutter motor 160. By reducing the speed of the cutting mechanism, the distance which the resulting dough ball will be "thrown" from the outlet nozzle 122 is reduced and more controlled when each cut is performed. Thus, the same landing position of the dough balls are consistently maintained.

FIG. 6D illustrates an alternate construction of the cutting blade. The alternate construction, rather than using a wire such as the wire 150 illustrated in FIG. 6A, uses a steel blade 150A that is curved to have a curvature that substantially corresponds to the curvature 128 of the outlet nozzle 122 as shown in FIG. 5C2.

It should be noted that, if desired, a lubricant can be used to lubricate each of the wires 150-1 through 150-4 or blade 150A upon each rotation. This is easily performed by having the wires, before a cut is performed, come in contact with the brush that has lubricant such as oil.

Figure 7:
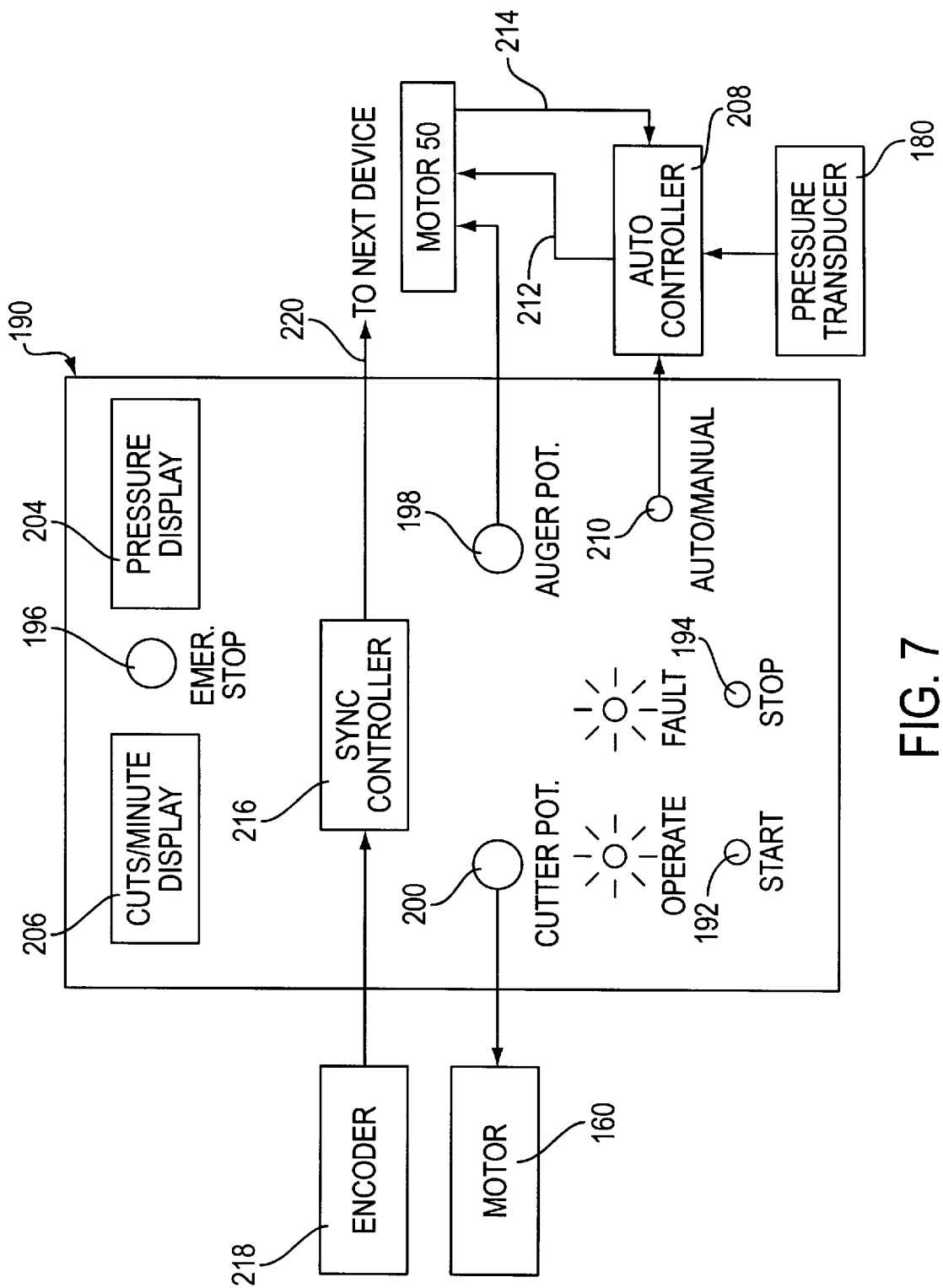
FIG. 7 illustrates the electronic control system according to the present invention.

FIG. 7 illustrates the electronic control system 190 according to the present invention, which has a start button 192, a stop button 194 and an emergency stop button 196. Start button 192 initiates operation of the transport device 10, whereas stop button 194 stops operation of the transport device 10. Emergency stop button 196 stops operation of not only the transport device 10, but also for the other devices, such as rounders, that form the production line.

An auger potentiometer 198 controls the speed of auger motor 50 whereas cutter potentiometer 200 controls the speed of cutter motor 160. Display 206 visually displays the number of cuts per minute, such as e.g. 110. Display 204 visually displays the pressure (such as 32 psi) that the dough exerts on pressure transducer 180. Transducer 180 is illustrated in both FIG. 7 and FIG. 1 and contains transducer element 181 as shown in FIG. 5B and which is disposed in the dough passageway as it enters manifold 100. This transducer element 181 provides a signal representative of pressure. This pressure corresponding to this signal is then displayed by display 204.

The signal provided by transducer element 181 is also input to automatic mode controller 208 illustrated in FIG. 7. Automatic mode controller 208 is a 4-bit controller that begins operation when a user desires the automatic mode and presses the auto mode start button 210. To use the automatic mode, the user will first obtain the desired pressure by adjusting the auger potentiometer 198. When the desired pressure is reached, the auto mode start button 210 is pressed. Thereafter, the automatic mode controller 208 will generate a signal to auger motor 50 via line 212 to cause auger motor 50 to increase or decrease in rotational speed, depending on the density of the dough at that point in time. This operation ensures that the pressure of the extruded dough remains substantially constant. It should be noted that automatic mode controller 208 sense the actual speed of the motor 50 and inputs a representative motor speed signal as depicted by line 214. Although this automatic mode feature ensures that a uniform amount of dough is extruded, it has been determined that the design of the tapered auger 40 as well as the other features of the present invention cooperate such that this automatic mode feature is primarily redundant and does not greatly facilitate obtaining a more uniform dough product.

FIG. 7 also illustrates sync controller 216, which is a 4-bit controller and receives a signal representative of the rotational speed of cutter 140 from an encoder 218 disposed within the machined slot 148 of shaft 142 as illustrated in FIG. 6E. This signal is used to visually display the cuts/minute on display 206, as well as being input sync controller 216, which then outputs a sync signal along line 220 which can be used to synchronize operation of transport device 10 with the next device along the production line.

Figure 8:
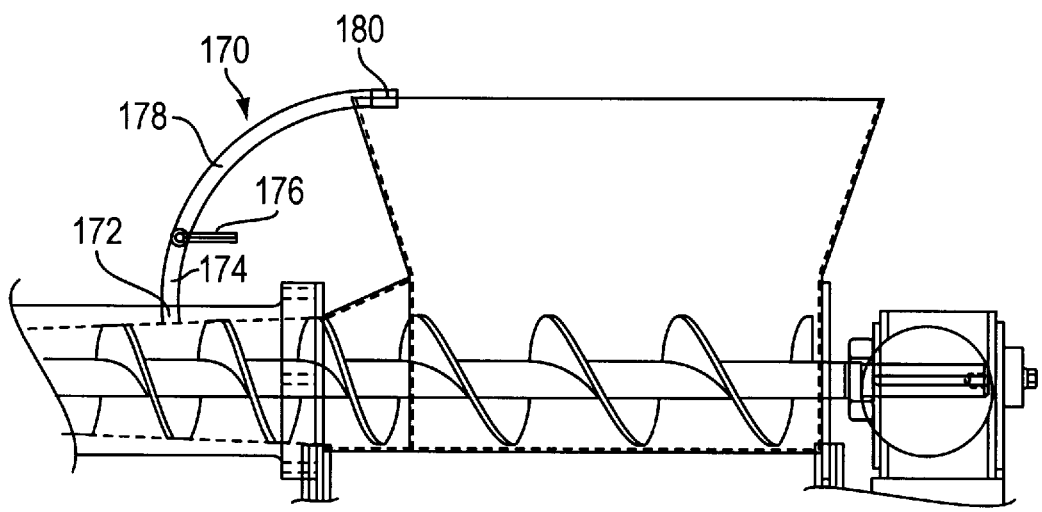
FIG. 8 illustrates the degassing/cleaning mechanism according to the present invention.

Another significant feature of the present invention is the degassing/cleaning mechanism 170 illustrated in FIGS. 1 and 8. A one inch diameter hole 172 is provided in tunnel 60 as illustrated in FIG. 4B. A metal pipe 174 having an inner diameter of about 0.75" leads to valve 176, which has attached to its other end a metal pipe 178 which has an end 180 that is threaded to receive a hose from a water source. End 180 is disposed over the hopper 20 during operation. In operation, dough is being directed through the tunnel 60. The hole 172, however, provides an outlet for undesired gas that is within the dough and is desirably removed. This excess gas, and small portions of dough which accompany it, are, during use, then placed back in the hopper 20, where the gas escapes and the small portions of dough enter back into the hopper, as is known in the art. The present invention, however, because of the taper in the auger 40 and the tunnel 60, can also be used to pump water. Accordingly, after all the dough for a particular run is extruded, a water source can be connected to the threaded end 180 and the auger 40 will pump the water under pressure through the manifold and clean all of these elements. Water can also be entered into the hopper 20 to clean the hopper prior to connecting the hose to the threaded end 180 of the degassing/cleaning mechanism 170. As a result, and further in view of the fact that only smooth edges exist within the manifold 100, there will be no build up of excess dough that can remain and potentially cause the source for undesirable bacteria and the like. It has been found that the by forcing water through the manifold at about 30–50 psi, that after a 10 minute cleaning operation, the interior of the manifold 100 is cleaned of all dough.

Although the previous descriptions are believed to describe the present invention, operation of the transport device 10 from beginning to end will now be summarized. Operation begins by turning on the device 10 using start button 192. Thereafter, the auger speed is adjusted to give, preferably, a speed to the auger 40 that will deliver dough at about 30 psi. The number of cuts per minute is then also adjusted using the cutter potentiometer to, preferably, provide about 100 cuts/minute by the rotational cutter 140. Dough is placed from a mixing device into the hopper, where enough dough is placed so that a dough ball forms as illustrated in FIG. 2B. Dough is then pumped from the hopper 20, through the tunnel 60, to the manifold 100. The auger support/knife 80 provides a first knife edge to cut the mass of dough material in half. The structure previously described relating to manifold 100 further divides the dough so that the arrives at each of ports P1–P4 illustrated in FIG. 2A, for example. The extruded dough is then cut using the rotational cutter 140 as previously described and then drops down onto a moving conveyor for transport to the next device along the production line. Once the dough transport and dividing operation is complete, the cleaning process described above is implemented to clean the dough transport device 10. Thereafter, the stop button 194 can be pressed to discontinue operation.

While the invention has been described in connection with what is presently considered to be the most practical and preferred embodiments, it is understood that the invention is not limited to the disclosed embodiment.

For example, though described in the preferred embodiment as a dough transport device, the present invention can be used to move materials other than dough, such as pastes, margarines and the like.

Figure 9A:
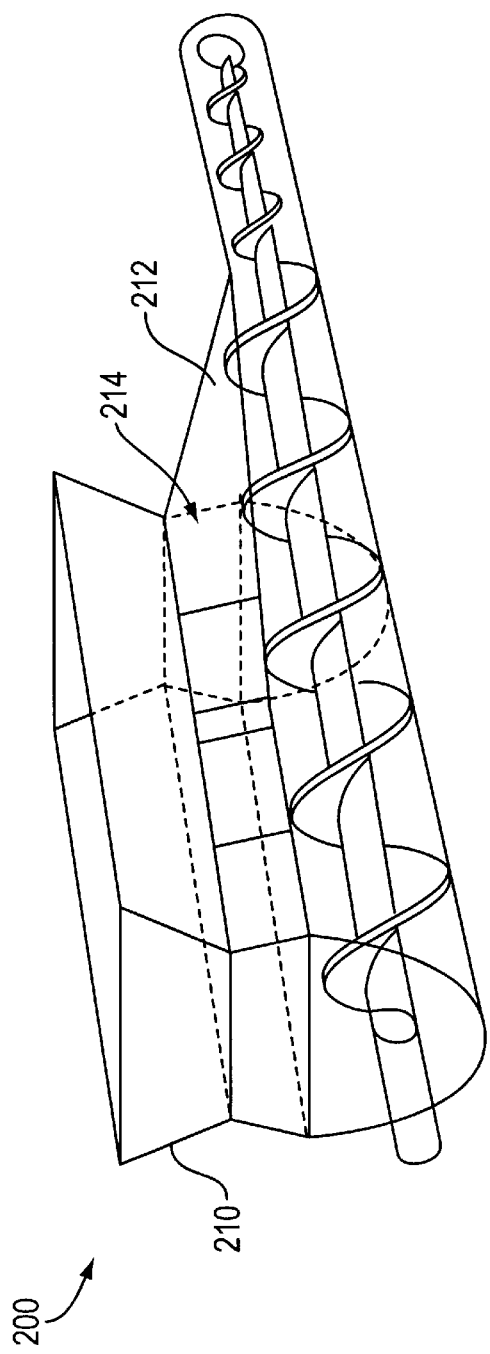
FIGS. 9A–9B illustrates an another embodiment of the present invention having features constructed so that cubed materials can be moved through the transport system of the present invention.
Figure 9B:
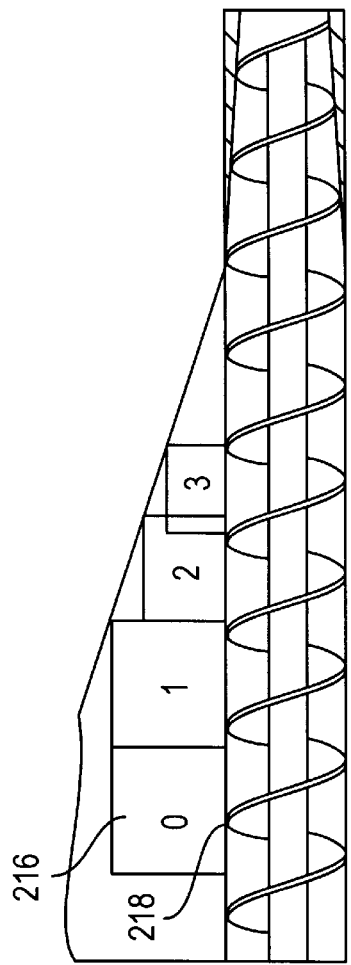

One specific modification to the preferred embodiment, for an application related to a paste material received by the transport system 10 in a cubed shape, such as cream cheese or margarine, which cubed material needs to be broken down, moved through the transport system and subsequently re-shaped, is illustrated in FIGS. 9A–9B. Device 200 illustrated in FIG. 9A contains the same features as device 10, other than that the outlet nozzles within the manifold can be modified to an appropriate, perhaps square, shape, as well as having a modified hopper, illustrated in FIG. 9A as hopper 210. The modified hopper 210 is essentially the same as hopper 20, except that the shroud portion 34 of hopper 20 in the previously described embodiment is enlarged so that the funnel shaped opening 212 of hopper 210 has an opening 214 that is larger than the side face of any of the cubed materials that are being directed through the auger pump. As a result, as shown in FIG. 9B, the cubed material 216 can be directed forward, with its bottom edge 218 continually grabbed by the auger flights. This efficiently allows the cubed material to be broken up and directed through the auger pump.

As another example, each of the features described above can be use singly or in combination, as set forth below in the claims, without other features described above which are patentably significant by themselves. Accordingly, the present invention is intended to cover various modifications and equivalent arrangements included within the spirit and scope of the appended claims.

I claim:

1. A cutting mechanism for cutting dough extruded from an outlet nozzle of a dough transport device comprising:

a shaft having a center rotational axis;

a plurality of spokes connected to said shaft and extending perpendicular to said shaft;

at least one cutting edge attached across said spokes so that said cutting edge is substantially parallel to said center rotational axis and provides an empty space between said cutting edge and said shaft; and a motor for rotating said shaft in a single direction about said center rotational axis and thereby rotating said cutting edge to allow said cutting edge to repeatedly cut said dough extruded from said outlet nozzle and located in said empty space when being cut.

2. A cutting mechanism according to claim 1 wherein said cutting edge is a wire.

3. A cutting mechanism according to claim 1 wherein said cutting edge is a curved blade.

4. A cutting mechanism according to claim 1 wherein:

said plurality of spokes is at least three, each of said at least three spokes being connected to said shaft at a center portion of each spoke; and first and second cutting edges attached across said spokes so that said first cutting edge is attached to a first end of said spokes and said second cutting edge is attached to a second end of said spokes, said first and second cutting edges being substantially parallel to said center rotational axis and providing said empty space between each said cutting edge and said shaft.

5. A cutting mechanism according to claim 4 wherein each of said first and second cutting edges is a wire.

6. A cutting mechanism according to claim 1 further including:

a second plurality of spokes extending perpendicular to said shaft and on a plane that is different from said plurality of spokes, and a second cutting edge attached across said second plurality of spokes so that said cutting edge is substantially parallel to said center rotational axis and provides another empty space between said cutting edge and said shaft.

7. A pump mechanism for transporting paste material in a paste material transport device comprising:

a hopper into which said paste material that needs to be transported is initially received, said hopper having a paste material entry area, a paste material transport opening and an auger shaft opening;

a tunnel having a funnel shaped portion disposed between first and second opening ends, said funnel shaped portion having a predetermined taper and said tunnel being attached to said hopper so that said first opening end aligns with said paste material transport opening of said hopper;

an auger disposed within said hopper and said tunnel, said auger having a first end extending through said auger shaft opening and a second end, a hopper section of said auger being disposed in said hopper and a tunnel section of said auger being disposed in said funnel shaped portion, said tunnel section of said auger being tapered to correspond to said predetermined taper of said funnel shaped portion of said tunnel, and a motor connected to said first end of said auger to allow for rotation of said auger and thereby transport said paste material from said hopper and through said tunnel at a consistent temperature.

8. A pump mechanism according to claim 7 further including a plate disposed within and on a high pressure side of said hopper, said plate having a curved portion that substantially corresponds to a diameter of said auger to provide a space between a predetermined angular portion of said auger within said hopper and an inner portion of said plate to which said paste material is confined and thereby keeps said paste material under pressure until it enters said tunnel.

9. A pump mechanism according to claim 8 wherein said plate is curved so that said inner surface of said plate forms an arc that curves in a plane that surrounds at least a 90° angular portion of said auger.

10. A pump mechanism according to claim 9 wherein said plate is made of stainless steel and has an edge that is welded to an inner surface of said hopper.

11. A pump mechanism according to claim 7 wherein said predetermined taper is between about 2° and 10°.

12. An pump mechanism according to claim 11 wherein said predetermined taper is about 3°.

13. A pump mechanism according to claim 7 wherein flights of said auger within said hopper section of said auger have a greater pitch than flights of said auger within said tunnel section of said auger to promote degassing of said paste material within said hopper and a consistent volume of said paste material entering said tunnel per unit time.

14. A pump mechanism according to claim 13 wherein said paste material is one of dough, cream cheese and margarine.

15. A pump mechanism according to claim 13 wherein said paste material is dough and said dough is transported through said tunnel, including said funnel shaped portion, to minimize interference with gluten structures of said dough.

16. A pump mechanism according to claim 7 wherein:

said auger includes threads at said first end and further comprises:

an auger nut which can be secured to said auger using said threads for adjustment of a gap between said auger and said tunnel; and a locking bolt which cooperates with said auger nut to ensure that said gap is maintained until readjustment of said gap occurs or normal wear causes said gap to increase.

17. A pump mechanism according to claim 16 wherein said paste material is one of dough, cream cheese and margarine.

18. A pump mechanism according to claim 16 wherein said paste material is dough and said dough is transported through said tunnel, including said funnel shaped portion, to minimize interference with gluten structures of said dough.

19. A pump mechanism according to claim 7 wherein said paste material is one of dough, cream cheese and margarine.

20. A pump mechanism according to claim 7 wherein said paste material is dough and said dough is transported through said tunnel, including said funnel shaped portion, to minimize interference with gluten structures of said dough.

21. A pump mechanism according to claim 7 further including a gas outlet hole disposed within said tunnel to promote degassing of said paste material.

22. An pump mechanism according to claim 7 wherein said consistent temperature is between 60°–70° F.

23. A pump mechanism according to claim 7 wherein said auger transports said paste material from said tunnel at a substantially constant pressure.

24. A dough transport device comprising:

a hopper into which said dough that needs to be transported is initially received, said hopper including a dough entry area, a dough transport opening and an auger shaft opening;

a tunnel having a funnel shaped portion disposed between first and second opening ends, said funnel shaped portion having a predetermined taper and said tunnel being attached to said hopper so that said first opening end aligns with said dough transport opening of said hopper;

an auger disposed within said hopper and said tunnel, said auger having a first end extending through said auger shaft opening and a second end, a hopper section of said auger being disposed in said hopper and a tunnel section of said auger being disposed in said funnel shaped portion, said tunnel section of said auger being tapered to correspond to said predetermined taper of said funnel shaped portion of said tunnel, said auger transporting said dough from said hopper and through said tunnel, including said funnel shaped portion, at a consistent temperature in order to minimize interference with gluten structures of the dough;

a manifold connected to said tunnel having a first dough input port aligned with said second opening end and a first dough output port so that dough entering said dough input port can be directed to said first dough output port, said first dough output port containing an output nozzle; and a rotational cutter having a cutting edge which rotates around a central axis of said rotational cutter, said cutting edge cooperating with said output nozzle on said manifold to cut dough extruded from said port, said dough being extruded at said consistent temperature.

25. A dough transport device according to claim 24 wherein said rotational cutter comprises:

a shaft that rotates about said central axis;

a plurality of spokes connected to said shaft and extending perpendicular to said shaft;

at least one cutting edge attached across said spokes so that said cutting edge is substantially parallel to said central axis and provides an empty space between said cutting edge and said shaft; and a motor for rotating said shaft about said central axis and thereby rotating said cutting edge in said single circular direction to allow said cutting edge to repeatedly cut said extruded dough from said outlet nozzle.

26. A dough transport device according to claim 25 wherein said cutting edge is a wire.

27. A dough transport device according to claim 24 further including a plate disposed within and on a high pressure side of said hopper, said plate having a curved portion that substantially corresponds to a diameter of said auger to provide a space between a predetermined angular portion of said auger within said hopper and an inner portion of said plate to which said paste material is confined and thereby keeps said paste material under pressure until it enters said tunnel.

28. A dough transport device according to claim 27 wherein:

said auger includes threads at said first end and further comprises:

an auger nut which can be secured to said auger using said threads for adjustment of a gap between said auger and said tunnel; and a locking bolt which cooperates with said auger nut to ensure that said gap is maintained until readjustment of said gap occurs or normal wear causes said gap to increase.

29. A dough transport device according to claim 28 wherein said manifold further includes:

a second dough output port containing an output nozzle; and first and second passageways that direct divided dough to said first and second dough output ports.

30. A dough transport device according to claim 28 further including a gas outlet hole disposed within said tunnel to promote degassing of said dough.

31. A dough transport device according to claim 30 wherein flights of said auger within said hopper section of said auger have a greater pitch than flights of said auger within said tunnel section of said auger to promote degassing of said dough within said hopper and a consistent volume of said dough entering said tunnel per unit time.

32. A dough transport device according to claim 27 wherein said plate is curved so that said inner surface of said plate forms an arc that curves in a plane that surrounds at least a 90° angular portion of said auger.

33. A dough transport device according to claim 32 wherein said plate is made of stainless steel and has an edge that is welded to an inner surface of said hopper.

34. A dough transport device according to claim 24 wherein said manifold further includes:

a second dough output port containing an output nozzle; and first and second passageways that direct divided dough to said first and second dough output ports.

35. A dough transport device according to claim 34 wherein said auger is supported at said second opening end by a substantially elongated auger support bracket disposed over a portion of said second opening end, said elongated auger support bracket including a center bearing in which said second end of said auger is maintained and a protruding edge on each side of said center bearing for dividing dough.

36. A dough transport device according to claim 34 wherein said output nozzle on each of said first and second output ports has a curved face and said rotational cutter rotates in a substantially circular direction to cut said dough extruded from each of said first and second output ports with a rounded cut.

37. A dough transport device according to claim 24 wherein said consistent temperature is between 60°–70° F.

38. A dough transport device according to claim 24 wherein said auger delivers said dough to said manifold at a substantially constant pressure.

39. A pump mechanism for transporting paste material in a paste material transport device comprising:

a hopper into which said paste material that needs to be transported is initially received, said hopper having a paste material entry area, a paste material transport opening and an auger shaft opening;

a tunnel disposed between first and second opening ends, said tunnel being attached to said hopper so that said first opening end aligns with said paste material transport opening of said hopper;

an auger disposed within said hopper and said tunnel, said auger having a first end extending through said auger shaft opening and a second end, a hopper section of said auger being disposed in said hopper and a tunnel section of said auger being disposed in said tunnel;

a plate disposed within and on a high pressure side of said hopper, said plate having a curved portion that substantially corresponds to a diameter of said auger to provide a space between a predetermined angular portion of said auger within said hopper and an inner portion of said plate to which said paste material is confined and thereby keeps said paste material under pressure until it enters said tunnel; and a motor connected to said first end of said auger to allow for rotation of said auger and thereby transport said paste material from said hopper into said tunnel so that nonmoving paste material does not collect within said hopper due to the presence of said plate within said hopper.

40. A pump mechanism according to claim 39 wherein said plate is curved so that said inner surface of said plate forms an arc that curves in a plane that surrounds at least a 90° angular portion of said auger.

41. A pump mechanism according to claim 40 wherein said plate is made of stainless steel and has an edge that is welded to an inner surface of said hopper.

42. A pump mechanism for transporting paste material in a paste material transport device comprising:

a hopper into which said paste material that needs to be transported is initially received, said hopper having a paste material entry area, a paste material transport opening and an auger shaft opening;

a tunnel having a funnel shaped portion disposed between first and second opening ends, said funnel shaped portion having a predetermined taper and said tunnel being attached to said hopper so that said first opening end aligns with said paste material transport opening of said hopper;

an auger disposed within said hopper and said tunnel, said auger having a first end extending through said auger shaft opening and a second end, a hopper section of said auger being disposed in said hopper and a tunnel section of said auger being disposed in said funnel shaped portion, said tunnel section of said auger being tapered to correspond to said predetermined taper of said funnel shaped portion of said tunnel, said auger further including:

threads at said first end;

an auger nut which can be secured to said auger using said threads for adjustment of a gap between said auger and said tunnel; and a locking bolt which cooperates with said auger nut to ensure that said gap is maintained until readjustment of said gap occurs or normal wear causes said gap to increase; and a motor connected to said first end of said auger to allow for rotation of said auger and thereby transport said paste material from said hopper and through said tunnel.

* * * * *